United States Patent
Leatham et al.

(10) Patent No.: US 10,392,136 B2
(45) Date of Patent: Aug. 27, 2019

(54) OFFLOAD ADJUSTMENT FOR SATELLITE IMAGE DIVERSITY

(71) Applicant: Raytheon Company, Waltham, MA (US)

(72) Inventors: James Leatham, Los Angeles, CA (US); Matthew E. Jenkins, Playa Vista, CA (US); Tim Johnson, Torrance, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/707,994

(22) Filed: Sep. 18, 2017

(65) Prior Publication Data

US 2019/0084698 A1  Mar. 21, 2019

(51) Int. Cl.
| | |
|---|---|
| *B64G 1/64* | (2006.01) |
| *B64G 1/10* | (2006.01) |
| *B64D 47/08* | (2006.01) |
| *G01C 11/02* | (2006.01) |
| *G02B 27/64* | (2006.01) |

(52) U.S. Cl.
CPC .......... *B64G 1/641* (2013.01); *B64D 47/08* (2013.01); *B64G 1/1021* (2013.01); *B64G 1/645* (2013.01); *G01C 11/025* (2013.01); *G02B 27/644* (2013.01); *B64G 2001/1028* (2013.01)

(58) Field of Classification Search
USPC .......................................................... 701/3
See application file for complete search history.

(56) References Cited

U.S. PATENT DOCUMENTS

| 4,814,607 A * | 3/1989 | Hofmann ............ G01C 11/025 250/235 |
| 5,064,152 A * | 11/1991 | Maute ...................... B64G 1/24 244/164 |

(Continued)

FOREIGN PATENT DOCUMENTS

| FR | 3024782 A1 | 2/2016 |
| JP | S58-200571 A | 12/1983 |

OTHER PUBLICATIONS

International Search Report for International Application No. PCT/US2018/042755 dated Oct. 23, 2018, 16 pages.

*Primary Examiner* — Tyler D Paige

(57) ABSTRACT

A method comprises operating a remote sensing vehicle comprising a host bus platform and a variable pitch instrument platform movably coupled to the host bus platform in at least one degree of freedom. The method comprises establishing a pointing position and scanning a target surface with the variable pitch instrument platform. The variable pitch instrument platform is dynamically movable relative to the host bus platform to vary the pointing position of the variable pitch instrument platform, thereby decoupling payload pointing from the host bus platform. Thus, payload data collection is independent of attitude control of the host bus platform. A method is provided of varying ground-sample-distance (GSD) value with a remote sensing vehicle. A remote sensing vehicle comprises a host bus platform and a variable pitch instrument platform for scanning or data collection of a target surface, and an dynamic coupling device (e.g., a gimbal(s)) movably coupling the variable pitch instrument platform to the host bus platform in at least one degree of freedom.

30 Claims, 12 Drawing Sheets

(56) References Cited

U.S. PATENT DOCUMENTS

| | | | |
|---|---|---|---|
| 5,067,672 A * | 11/1991 | Bouzat | B64G 1/007 244/158.5 |
| 5,682,034 A | 10/1997 | Schueler | |
| 5,738,309 A * | 4/1998 | Fowell | B64G 1/24 244/164 |
| 5,999,211 A * | 12/1999 | Hedges | G01C 11/025 348/144 |
| 6,285,395 B1 * | 9/2001 | Firpo | B64G 1/365 348/144 |
| 7,270,304 B2 | 9/2007 | Dailey et al. | |
| 8,767,210 B1 * | 7/2014 | Lukashin | G01J 1/10 356/369 |
| 9,250,328 B2 * | 2/2016 | Ashjaee | G01C 21/005 |
| 2005/0177307 A1 | 8/2005 | Greenfield et al. | |
| 2007/0027590 A1 * | 2/2007 | Liu | G01C 19/00 701/13 |
| 2007/0125910 A1 * | 6/2007 | Cepollina | B64G 1/007 244/172.6 |
| 2008/0237399 A1 * | 10/2008 | Caplin | B64G 1/1085 244/158.4 |
| 2009/0251773 A1 * | 10/2009 | Danziger | B64G 1/1021 359/367 |
| 2013/0293413 A1 * | 11/2013 | Robinson | B64G 3/00 342/357.25 |
| 2014/0301645 A1 * | 10/2014 | Mattila | G06K 9/00671 382/182 |
| 2015/0284109 A1 * | 10/2015 | Newton | B64G 1/002 701/3 |
| 2015/0348264 A1 * | 12/2015 | Yoon | B64G 1/361 348/117 |
| 2016/0087713 A1 * | 3/2016 | Oderman | H04B 7/18591 370/319 |
| 2016/0114909 A1 * | 4/2016 | Walker | B64G 1/222 244/158.5 |
| 2016/0131737 A1 * | 5/2016 | Aymes | B64G 3/00 342/357.2 |
| 2016/0370227 A1 * | 12/2016 | Zhang | H04N 5/2251 |
| 2017/0045623 A1 * | 2/2017 | Zlogar | G01S 3/14 |
| 2017/0192095 A1 * | 7/2017 | Jobanputra | G01S 19/02 |
| 2017/0329126 A1 * | 11/2017 | Squires | G02B 26/0816 |

* cited by examiner

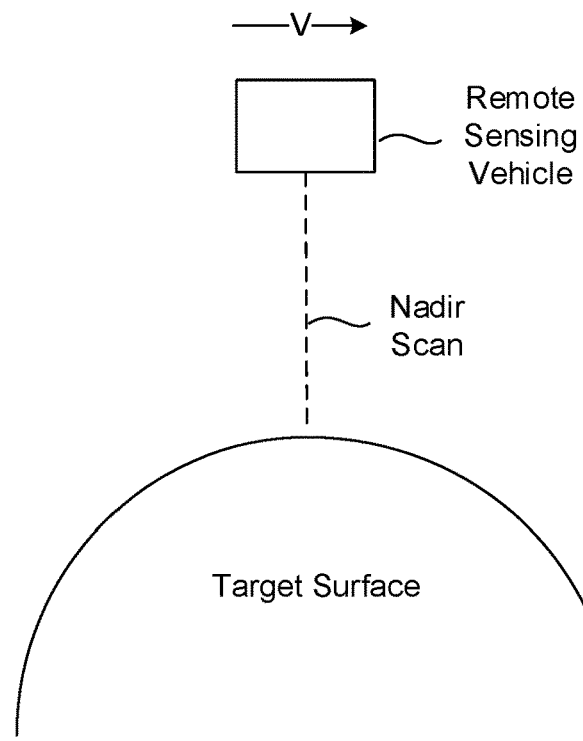
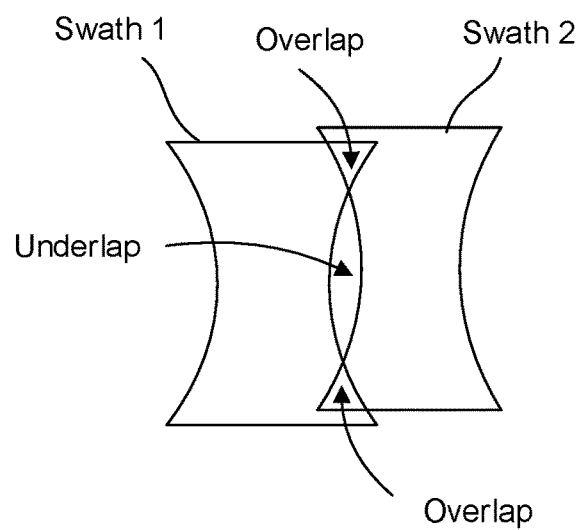
FIG. 1
(prior art)

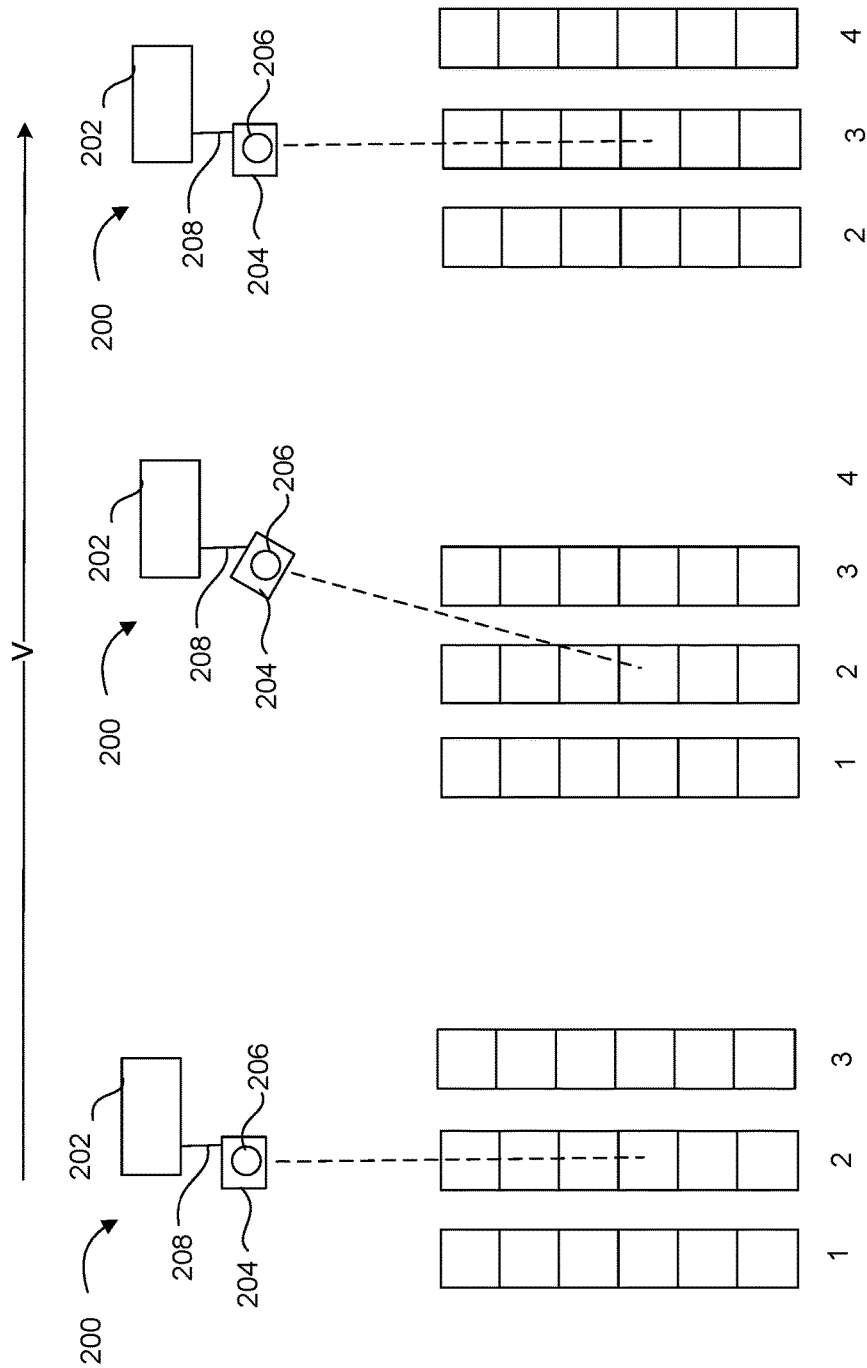

US 10,392,136 B2

OFFLOAD ADJUSTMENT FOR SATELLITE IMAGE DIVERSITY

GOVERNMENT LICENSE RIGHTS

This invention was made with government support under contract NNG10XA05C awarded by the National Aeronautics and Space Administration (NASA). The government has certain rights in the invention.

BACKGROUND

Remote sensing vehicles such as satellites are commonly used for electro-optical, infrared, and RF imaging of the surface of celestial bodies, such as the earth. FIG. 1 illustrates one such system known in the prior art for capturing swaths/images of a target surface of a celestial body. As a particular remote sensing vehicle orbits in a certain flight advancement velocity (i.e., illustrated by the V arrow), a sensor is pointed at Nadir (in elevation, or along-track, angle) and perpendicular to the flight direction. In a push-broom system, the image sensor covers the entire cross-track dimension, whereas in a whisk-broom system, the image sensor is scanned in the cross track direction rapidly as the vehicle is travelling, usually more slowly, in the along-track direction. In a whisk broom scanning satellite, a mirror rapidly scans in the cross-track direction to effectively point the sensor at a target surface for imaging. As the vehicle advances, the sensor captures swaths of the target surface area to generate an image. Such whisk broom scanning is implemented with the Visible Infrared Imaging Radiometer Suite (VIIRS) satellite-mounted sensor. A VIIRS satellite sensor payload is a scanning radiometer that collects visible and infrared imagery and radiometric measurements of land, atmosphere, cryosphere, and oceans. VIIRS data is used to measure cloud and aerosol properties, ocean color, sea and land surface temperature, ice motion and temperature, fires, and Earth's albedo, for instance. Climatologists use VIIRS data to improve our understanding of global climate change.

As illustrated in FIG. 1, when collecting data or scanning at Nadir elevation angle with such a remote sensing vehicle, a particular resulting swath/image is bowtie-shaped (due to the curvature of the celestial body when scanning at Nadir). Due to this bowtie shape, successive swaths 1 and 2 will have a pixel underlap between the middle portion of such swaths 1 and 2, as shown. Overlap is also prevalent at corner areas of the adjacent swaths 1 and 2, as shown. Both the underlap and overlap issues can be problematic when stitching the swaths together to generate a desired image. In particular, underlap results in incomplete coverage of the celestial body, leaving gaps in collected data. There also exists issues with time delay and integration (TDI) dwell when scanning at Nadir with the VIIRS satellite because of the limitations of the sensor platform being static relative to the host bus.

One solution to address these issues is to manually change the pointing angle of the sensor platform during sensor integration to the satellite. However, this solves only the underlap issue, and does not address other issues such as TDI being tied to the gross satellite bus motion. Another solution involves changing the angular position of the Nadir deck while in orbit. Another solution involves changing the attitude of the satellite bus itself while in orbit. Finally, yet another solution involves changing the sensor itself, such as changing the "heartbeat" master clock, scan rate, and/or optical design.

These prior solutions often result in unintended consequences or transient behaviors of the satellite bus, and can make the scan-to-scan (revisit) and instrument-to-instrument comparisons less tractable. This is exacerbated by the fact that the host bus typically has many other sensors on-board, so changing the attitude of the host bus can negatively affect such ancillary sensors.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1 illustrates a method of collecting data from a target surface with a remote sensing vehicle as known in the prior art;

FIGS. 7A-7C illustrate a method of continuous look-back scanning with a remote sensing vehicle in accordance with an example of the present disclosure;

Figure 2:
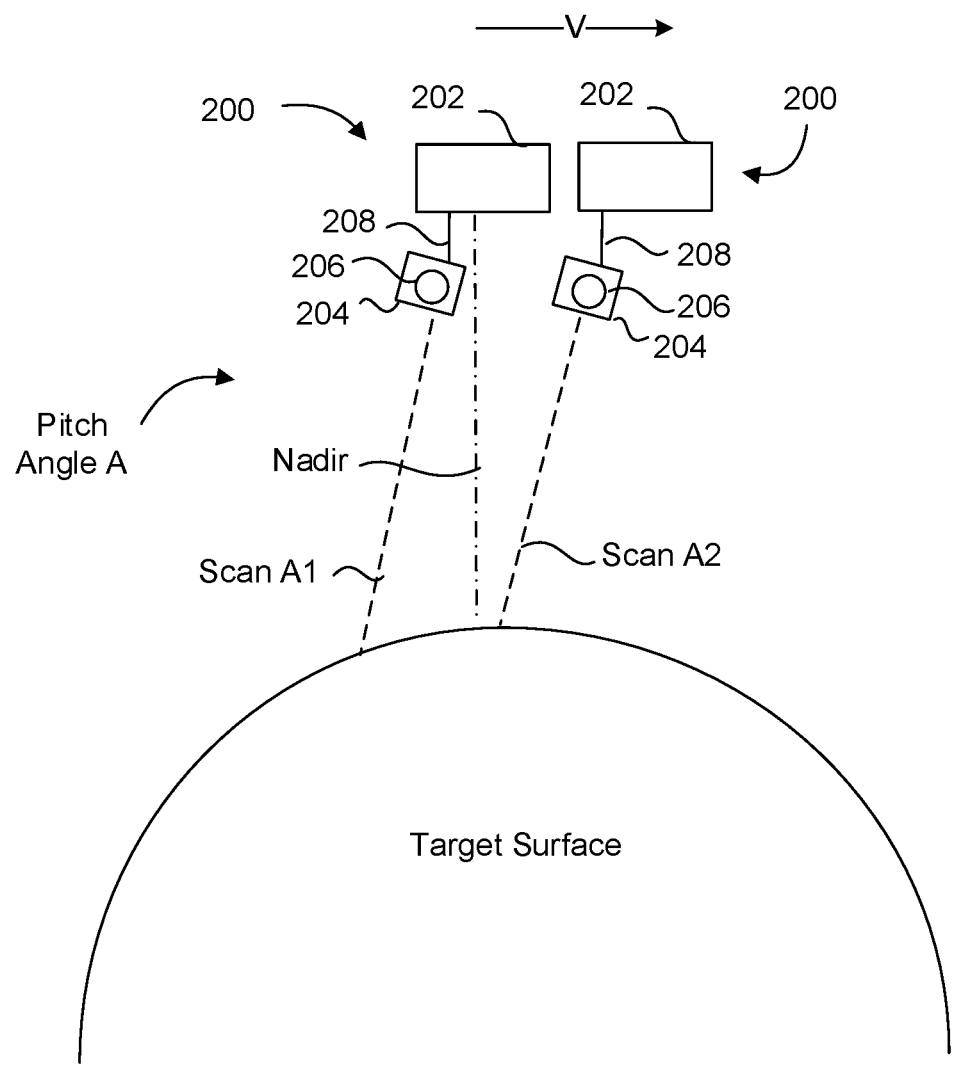
FIG. 2 illustrates a method of collecting data from a target surface with a remote sensing vehicle in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Generally speaking, the present technology offloads scan coverage, areal coverage, pixel size determination, integration time, look angle, and variability in each of these parameters as a function of time or satellite location, such that these are handled off-sensor and off-satellite-bus. The offload consists of an interface with static or dynamic tip or tip-tilt capability, such that the entire sensor can be rotated as a solid-body rotation. Thus, the entire sensor can be back-scanned synchronous with the satellite forward advance in order to dwell on a particular region of interest or to precisely effect TDI. Similarly, an interesting area or feature can be revisited in transit by pitching back or forward the entire sensor without interfering with the satellite bus. Collecting data (e.g., scanning) with a constant angle from Nadir can be chosen to increase FOV in the along-track direction; and tilting along with tipping can be used to define ground-step distance (GSD) along-track and cross track resolution, allowing selection of pixel size in each dimension separately, even dynamically changed across-track in a whisk-broom system. All of this can be carried out in a manner, such that the sensor algorithms and the vehicle bus parameters are not impacted.

In one example there is provided a method of decoupling payload pointing from a host bus platform. The method comprises operating a remote sensing vehicle comprising a host bus platform and a variable pitch instrument platform. The variable pitch instrument platform is moveably coupled to the host bus platform in at least one degree of freedom. The method comprises establishing a pointing position of the variable pitch instrument platform, and collecting data from a target surface with the variable pitch instrument platform at a first pitch angle relative to Nadir to generate a first data set (corresponding to a generated first image). Thus, payload pointing is decoupled from the host bus platform attitude. In addition, pixel size, integration time, etc. can be decoupled from the single design point defined by the orbit and scan speed.

In one example, the method comprises moving or otherwise manipulating the variable pitch instrument platform relative to the host bus platform to vary the pointing position of the variable pitch instrument platform. The method can further comprise collecting data from the target surface with the variable pitch instrument platform at a second pitch angle relative to Nadir to generate a second data set (corresponding to a generated second image).

In one example, establishing pointing angles to the target surface with the variable pitch instrument platform off-loads payload pointing from the host bus platform.

In one example, modifying the pointing position of the variable pitch instrument platform facilitates dynamic control of pixel shape and size of at least one of the first and second data sets.

In one example, the method comprises repeatedly collecting data from the target surface at the first pitch angle to generate a plurality of successive images (from successive collected data sets), wherein adjacent images of the plurality of successive images have overlapping pixels.

In one example, the method comprises remotely controlling the pointing position and roll angle of the variable pitch instrument platform from a remote location.

In one example there is provided a method of varying ground-sample-distance (GSD) value with a remote sensing vehicle. The method comprises operating a remote sensing vehicle comprising a variable pitch instrument platform and a host bus platform. The variable pitch instrument platform is movably coupled to the host bus platform in at least one degree of freedom. The method comprises collecting data (e.g., scanning) from a target surface with the variable pitch instrument platform at a first pitch angle relative to Nadir to generate a first data set. The method comprises varying a pointing position of the variable pitch instrument platform by moving or otherwise manipulating the variable pitch instrument platform relative to the host bus platform. The method comprises collecting data from the target surface with the variable pitch instrument platform at a second pitch angle to generate a second data set, thereby varying a GSD value.

In one example, the method comprises synchronizing or otherwise coordinating the second pitch angle with a relative velocity (or other movements) of the remote sensing vehicle, such that the first and second images (from first and second data sets) are substantially similar, and without modifying the attitude of the host bus platform.

In one example there is provided a remote sensing vehicle comprising a host bus platform; a variable pitch instrument platform comprising a detector for collecting data from a target surface; and a dynamic coupling device movably coupling the variable pitch instrument platform to the host bus platform in at least one degree of freedom. The variable pitch instrument platform is movable relative to the host bus platform to establish a pointing position of the variable pitch instrument platform, such that payload pointing is decoupled from the host bus platform attitude, and such that the payload data collection is independent of attitude control or other movement of the host bus platform.

In one example, the dynamic coupling device comprises a gimbal system that facilitates movement of the variable pitch instrument platform relative to the host bus platform.

In one example, the detector of the variable pitch instrument platform is configured to generate a first data set when in a first pitch angle position, and to generate a second data set when in a second pitch angle position, upon movement of the variable pitch instrument platform relative to the host bus platform.

In one example, the variable pitch instrument platform is configured to be dynamically moved relative to the host bus platform during orbit to modify a pitch angle of the variable pitch instrument platform, thereby varying a GSD value between successive adjacent images gathered by the detector of the variable pitch instrument platform.

To further describe the present technology, examples are now provided with reference to the figures.

FIG. 2 illustrates a method of decoupling payload pointing from a host bus platform attitude of a remote sensing vehicle in accordance with an example of the present disclosure. In one aspect, a remote sensing vehicle 200 comprises a host bus platform 202 and a variable pitch instrument platform 204 having one or more imaging sensors (e.g., a detector) 206 for scanning or collecting data from a target surface (e.g., a celestial body such as earth). The remote sensing vehicle 200 can be similar to the VIIRS satellite discussed above (e.g., a whisk or push broom scanning satellite at low orbit). However, this is not intended to be limiting in any way. The variable pitch instrument platform 204 can comprise a number of components for scanning a target surface, such as a rotary solenoid, a rack-and-pinion actuator, a flexure mount, a four-bar linkage, or many other options known to practitioners skilled in mechanical designs of mechanisms.

As mentioned above, the remote sensing vehicle 200 can be a whisk broom scanning satellite, such at a VIIRS satellite. Whisk broom scanning will not be discussed in detail, however some background and detail is provided. As with known whisk broom scanning satellites, scanning with a detector is generally orthogonal to the direction of motion of the satellite (e.g., at Nadir elevation angle). The detector imaging will have a 360 degree spin rate about the satellite such that, when the detector "sees" the target surface during its spin cycle, the detector collects data or images the target surface. Hence the analogy to a whisk broom that whisks back and forth over an area. Such scanning is often referred to as "the heartbeat" of the detector. Of course, the detector is not always physically spinning itself, rather a mirror moves or rotates to reflect radiation to the detector during normal scanning operations. Such "heartbeat" of the detector can be timed with the velocity of the satellite. The detector 206 of the present disclosure can comprise similar detectors as that of known VIIRS satellites, or other detectors as will be recognized by those skilled in the art. However, as discussed below, unlike prior systems and methods, scanning with the detector 206 of the present technology can be carried out such that the scanning is not orthogonal to the orbit direction of the satellite. That is, scanning/pointing with the detector 206 can be carried out dynamically in a pitched back or pitched forward manner.

Alternatively, the remote sensing vehicle 200 (and its detector 206) can operate in a push broom scanning manner such that, at any time only certain points are imaged that lie in the plane defined by the optical center and the line containing the sensor array. That is, the detector 206 may have an array of CCDs along an imaging plane. This plane is known as the instantaneous field of view (IFOV) plane. Accordingly, as the vehicle 200 advances forward, a linear array of sensors (CCDs) simultaneously capture images of the target surface for electro-optical, infrared, and RF imaging of the target surface. Hence the analogy to "push brooms".

Whether the detector 206 is configured in a whisk broom or push broom scanning configuration, the variable instrument platform 204 is dynamically movable to modify the pointing position of the variable instrument platform 204 (and consequently the detector 206) relative to the host bus during flight or orbit. More specifically, a dynamic coupling device 208 movably couples the variable pitch instrument platform 204 to the host bus platform 202 in at least one degree of freedom (an example of a dynamic coupling device will be discussed further regarding FIG. 11). Accordingly, the variable pitch instrument platform 204 is movable relative to the host bus platform 202 to establish (and modify) a pointing position of the variable pitch instrument platform 204, and consequently boresight of the detector 206. Thus, because the pitch instrument platform 204 is movably coupled to the host bus platform 202, payload pointing is decoupled from the attitude of the host bus platform 202 in that the payload data collection (via detector 206) is independent of attitude or other movement control of the host bus platform 202. More specifically, as discussed in the background section above, prior systems require changing the attitude of a host bus in order to control or change the pointing position of a detector or sensor platform, which affects various other systems and sensors of the host bus. In the present example, because the variable pitch instrument platform 204 is movable relative to the host bus platform 202, the variable pitch instrument platform 204 can be moved relative to the host bus platform 202 during orbit to dynamically establish (and modify) a pitch angle and pointing position of the variable pitch instrument platform 204 relative to Nadir without impacting a current orbit attitude of the host bus platform 202.

Establishing an initial pointing position can occur during manufacture and/or maintenance, such as by manually/locally setting the variable pitch instrument platform 204 to be at a desired pitch angle via the dynamic coupling device 208 relative to the host bus platform 202. Alternatively, establishing the pointing position can occur during orbit by actuating (autonomously or manually) the variable pitch instrument platform 204 to be rotated and/or panned about the dynamic coupling device 208 to a desired pitch angle. In one example, the pitch angle A of FIG. 2 can be between 5 and 20 degrees relative to Nadir. In the illustrated example, the variable pitch instrument platform 204 is pitched back to a look-behind angle. However, the variable pitch instrument platform 204 can be pitched forward to a look-ahead angle. In any event, the pitch angle can be a few degrees in either direction and up to an angle associated with the horizon. Example mechanisms for actuating or moving the variable pitch instrument platform 204 are further discussed regarding FIG. 11.

Figure 3A:
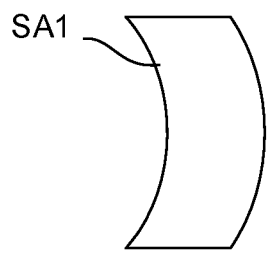
FIG. 3A illustrates a swath resulting from the method of FIG. 2 in accordance with an example of the present disclosure.
Figure 3B:
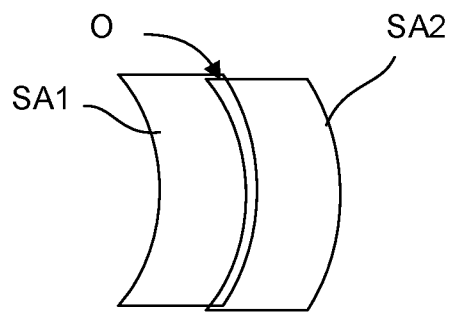
FIG. 3B illustrates adjacent swaths resulting from the method of FIG. 2 in accordance with an example of the present disclosure.

With reference to FIGS. 3A and 3B, and continued reference to FIG. 2, once the initial pointing position is established (e.g., pitch angle A) the target surface can be scanned (scan A1) by the detector 206 of the variable pitch instrument platform 204. FIG. 3A shows a captured swath SA1 upon such first scan at the first pitch angle A, which, advantageously, is in the shape of a meniscus. As illustrated in FIG. 2, as the remote sensing vehicle 200 advances forward (to the right) during orbit, a second scan SA2 is captured (at the same first pitch angle A) of the target surface by the detector 206. As expected, swath SA2 is also in a similar shape of a meniscus as swath SA1. As a result, and as shown in FIG. 3B, the successive/adjacent swaths SA1 and SA2 have a pixel overlap region O along the continuous arced sides of the respective swaths SA1 and SA2. Notably, there is no underlap between adjacent swaths, such as occurs when scanning at Nadir (FIG. 1) with prior known remote sensing vehicles.

Pitch-back scanning (as in FIG. 2) and pitch-forward scanning can provide more areal coverage than a simple Nadir scan, which eliminates the aforementioned under scan coverage of the target surface, as well as defining the shape and IFOV of pixels of adjacent swaths. Because the variable pitch instrument platform 204 is movably coupled to the host bus platform 202, the variable pitch instrument platform 204 can be pitched forward at a certain angle in a similar manner as exemplified regarding FIG. 2, and it can generate successive swaths as in FIG. 3B, but with a mirrored meniscus shape. Thus, establishing pointing angles to the target surface with the variable pitch instrument platform 204 off-loads payload pointing from the host bus platform.

In one aspect where the detector 206 is in a push broom configuration on the variable pitch instrument platform 204, it can similarly be pitched forward/back to look ahead/behind during push broom scanning, and the swaths will have a similar shape and overlap as shown on FIG. 3B during pitch-back scanning, for example.

Figure 4:
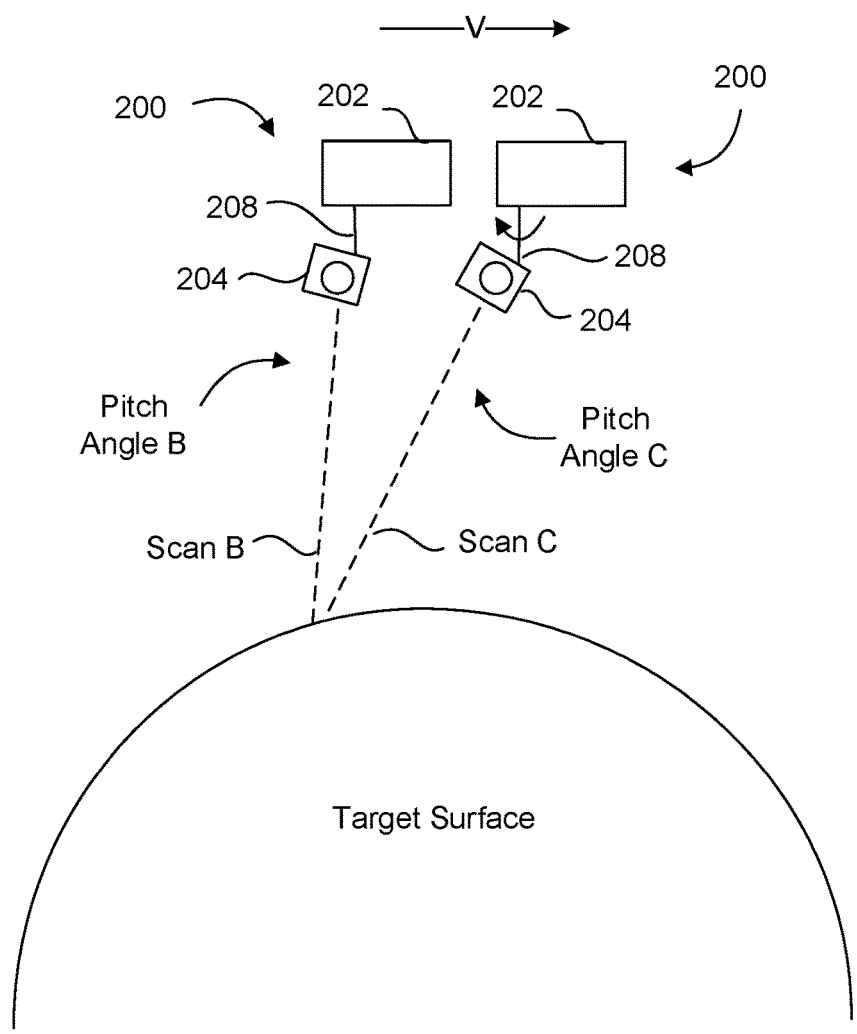
FIG. 4 illustrates a method of collecting data from a target surface with a remote sensing vehicle in accordance with an example of the present disclosure.
Figure 5:
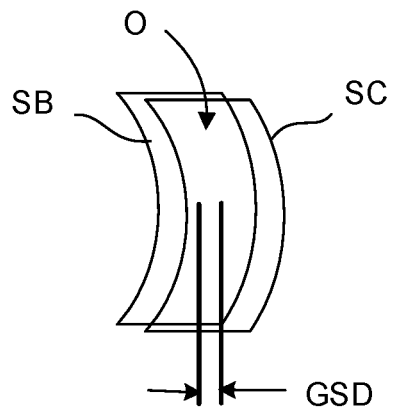
FIG. 5 illustrates adjacent swaths resulting from a method of collecting data from with a remote sensing vehicle in accordance with an example of the present disclosure.

With reference to FIG. 4, the variable pitch instrument platform 204 can be dynamically moved during orbit to fit a particular purpose and provide certain advantages, such as those discussed herein. At the outset, and in one example, the variable pitch instrument platform 204 can be pitched-back at pitch angle B and perform scan B. In this example assume that the pitch angle B is 5 degrees back relative to Nadir. Upon performing scan B, a resulting swath SB is generated (as shown in FIG. 5). As illustrated in FIG. 4, as the remote sensing vehicle 200 advances forward (to the right) during orbit, the variable pitch instrument platform 204 can be moved (rotated and/or panned) to a second pitch angle C (e.g., 10 degrees relative to Nadir) via the dynamic coupling device 208. Thus, after the pointing position of the detector 206 is adjusted to a desired position (i.e., pitch angle C) by moving the variable pitch instrument platform 204 via the dynamic coupling device 208, a second scan can be performed at pitch angle C of the target surface by the detector 206 to generate a second swath SC. In some aspects, movement of the variable pitch instrument platform 204 can be coordinated with and correspond to the orbital height or altitude, velocity, etc. of the remote sensing vehicle 200 to achieve and/or maintain a desired pointing position or pitch angle.

As a result and as shown in FIG. 5, the successive/adjacent swaths SB and SC have a substantial amount of pixel overlap O along side pixel areas of the swaths SB and SC. And as another result, a ground scan distance (GSD) value between the swaths SB and SC is relatively short (as compared to the swaths of FIG. 3B, for example, where the pitch angle remained constant between scans). Accordingly, a relatively large area of the target surface can be re-scanned (or continuously scanned) during orbit with the variable pitch instrument platform 204 by modifying the pitch angle independent of attitude control and orientation of the host bus platform 202. Thus, payload pointing is offloaded from the host bus platform 202 to the variable pitch instrument platform 204. By offloading the payload pointing, the variable tip-tilt instrument platform facilitates de-coupling such payload pointing from the scanning, the optical design, and the timing chain at the higher-bandwidth domain, of the variable pitch instrument platform 204 and its detector 206. Scanning usually occurs in a repetitive manner with control and time constants that are more rapid than bulk pointing excursions. By offloading the large whole-instrument motions that occur at a lower bandwidth, coupling into the control sequence is avoided, as are the possibility of interrupt errors in the control logic. Similarly, by avoiding changes to the optical prescription, offloading pointing to an external mechanism minimizes possibility of unintended consequences. Furthermore, allowing in-flight adjustments to payload pointing and field-of-view (FOV) relaxes assembly tolerances and reduces time spent and cost in the alignment and test phase.

Referring again to FIG. 4, in one example illustrating the advantage of dynamic control of the variable pitch instrument platform 204, during pitch-back scanning at pitch angle B, if scan B captures an event or area of interest it could be desirable to scan the same target surface location in order to re-scan the event or area of interest. Alternatively, it could also be desirable to dynamically modify the pointing position of the variable instrument platform 204 during scanning (or collecting data) to continuously scan the same target surface location of the event or area of interest (e.g., see the discussion regarding FIGS. 7A-8C). However, in such a case it would be beneficial not to have to adjust the attitude of the host bus platform 202 because its numerous instruments/sensors may be negatively affected and need adjustment (whether in real-time or pre-programmed). This could over constrain the operation of the satellite and the sensors as a whole. Conversely, with the technology disclosed herein, the variable pitch instrument platform 204 can be moved in a dynamic manner (i.e., in real-time as the host bus platform 202 orbits) to modify the pointing position of the detector 204 to scan at pitch angle C (or continuously scan at pitch angle B in a push broom configuration) to scan the same area of interest of the target location for as long as possible without altering the attitude, orientation, etc. of the host bus platform 202. Again, the dynamic control and movement of the variable pitch instrument platform 204 can be coordinated with or correspond to the orbital parameters of the remote sensing vehicle 200 and the host bus platform 202. For example, in the case of the host bus platform 202 being in the form of a satellite, as the satellite orbits at a given velocity and at a given altitude and in a given direction, the variable pitch instrument platform 204 can be caused to move, such that the target surface location is scanned, rescanned or continuously scanned as desired. Indeed, the pitch angle, the yaw angle, or any other movements in the degrees of freedom available in the variable pitch instrument platform 204 can be caused to change relative to the satellite and as the satellite moves relative to the target surface location.

Advantageously, the example of FIGS. 4 and 5, for instance, allows for real-time adjustment of pixel resolution and object (e.g., Earth) coverage, as well as facilitating manipulation of the shape, size, and skewness of the particular swath/projection. Resolution, for example, is impacted by pitch forward or back in elevation, whereas shape and skewness can be affected locally by roll, tip, and tilt. This allows higher band-to-band registration between pixels in adjacent spectral bands.

Moreover, typically, as a satellite orbits around a celestial body it will continually degrade toward the celestial body (i.e., it constantly loses altitude due to being subject to the slight gravitational pull that exists within a low-earth orbit). Using prior scanning systems that are coupled directly to the host bus platform, such degradation can pose complications to various other systems of the satellite, particularly in the event that the attitude of the entire host bus platform is altered in order to account for the degradation and to perform a desired scanning function, such as would be the case when the pointing position of one of the detectors is changed by altering the attitude of the satellite. As indicated, this type and method of altering pointing position can cause other systems on the satellite or host bus platform to be over constrained. On the other hand, with the present technology described herein, because the detector 206 is effectively decoupled from the systems of the host bus platform 202, degradation can be accounted for by slightly and constantly moving the variable pitch platform 204 accordingly and as needed during degradation, which movement can be accomplished independent of the host bus platform 202.

Figure 6:
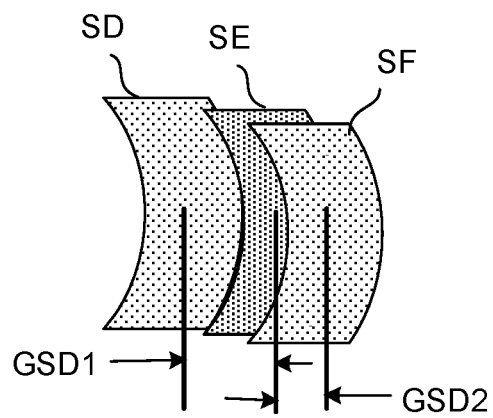
FIG. 6 illustrates adjacent swaths resulting from a method of collecting data from with a remote sensing vehicle in accordance with an example of the present disclosure.

With continued reference to FIGS. 2 and 4, and with reference to FIG. 6, illustrated is an example method of varying a GSD value via the remote sensing vehicle 200. In this example, swaths SD and SE are successive swaths captured at a first pitch angle (e.g., similar to FIGS. 2 and 3B). This defines a first GSD value between swath SD and SE, labeled as GSD1, which, for example, can be approximately 11 km (see the below table). The pointing position of the variable pitch instrument platform 204 can then be varied or modified by moving the variable pitch instrument platform 204 relative to the host bus platform 202 at a second pitch angle different from the first pitch angle, as described above with reference to the example of FIG. 4. That is, the second pitch angle (e.g., 10 degrees) would be greater than the first pitch angle (e.g., 5 degrees) during a pitch-back scanning operation. Thus, swath SF is generated upon scanning with the detector 206 at the second pitch angle, which defines a second GSD value between swath SE and SF, labeled as GSD2 (e.g., a 5 km GSD2). In this example, GSD1 is greater than GSD2. Therefore, a particular GSD value can be varied between adjacent swaths by modifying the pointing position of the detector 206 upon moving the variable pitch instrument platform 204 independent of attitude control the host bus platform 202. This is advantageous to dwell on an evolving scene such as the eye of a hurricane or a rapidly advancing forest fire front, as well as to allow increased signal-to-noise ratio (i.e. image clarity) for a static scene, or decoupling TDI from forward speed of advance of the satellite bus. This, in turn, could allow use of a lower cost sensor in the design phase.

FIGS. 7A-7C illustrate the advantages of TDI dwell when continuously look-back scanning by modifying the pointing position of the variable pitch instrument platform 204 during scanning of (or collecting data from) a target surface. More specifically, FIG. 7A shows the remote sensing vehicle 200 scanning target surface area or location 2 at Nadir (i.e., generating swaths/image of the target surface). As the remote sensing vehicle 200 advances forward as illustrated in FIG. 7B, the variable pitch instrument platform 204 can be adjusted or moved (as discussed above) to be pitched-back relative to the velocity of the remote sensing vehicle 200 to continuously scan the target surface area 2 for a predetermined time period. Thus, such movement to pitch-back the variable pitch instrument platform 204 is synchronized with or made to correspond to the velocity of the remote sensing vehicle 200 during orbit. As shown in FIG. 7C, the variably pitch platform 204 can further be configured to quickly snap/move forward to scan target surface area or location 3 at Nadir. Such slow look-back and fast snap-forward illustrated in FIGS. 7A to 7C can improve or maximize TDI dwell, which can provide more dwell time for each pixel row (or target surface area) during scanning as there is less transition time between rows (areas). In addition, with a wider image sensor, a longer GSD plus the dwell plus snap-back allows greater signal-to-noise ratio, allowing lower-performance (perhaps uncooled saving size, weight, and power) to be used with similar image quality to systems not using this scheme. This facilitates payload persistence of the variable pitch instrument platform 204 on a fixed point without affecting satellite bus transit and mission parameters, for instance.

Figure 8C:
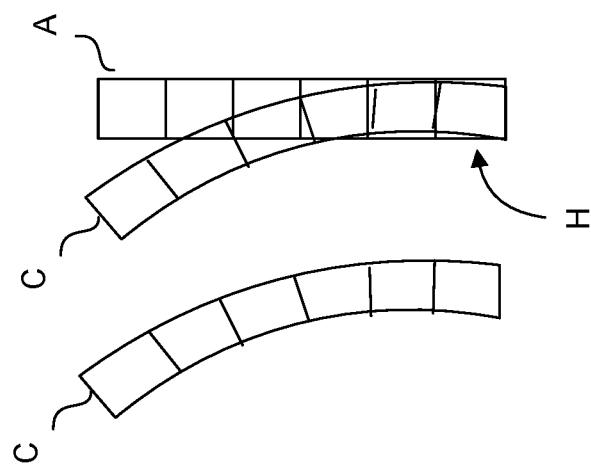
FIGS. 8A-8C illustrate various swath shapes when collecting data with a remote sensing vehicle in accordance with an example of the present disclosure.
Figure 8B:
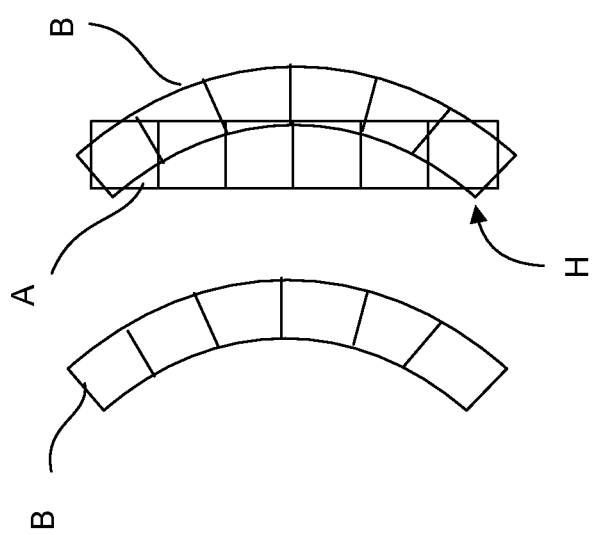
Figure 8A:
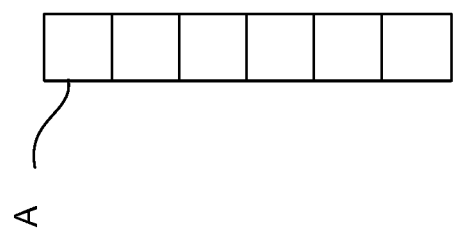

FIGS. 8A-8C illustrate the advantages of pixel projection versatility when looking-back and rotating the variable pitch instrument platform 204 (i.e., using a variable pitch instrument platform 204 configured and operable to move in two degrees of freedom) during a scanning event by modifying the pointing position of the variable pitch instrument platform 204. More specifically, FIG. 8A shows an example Nadir scan swath A, and FIG. 8B shows an example look-back scan swath B in the shape of a meniscus as the result of moving (i.e., pitching back) the variable pitch instrument platform 204. When overlaying swath A and swath B to observe an area of interest H, for instance, the pixel overlay is not ideal because of the distortion of the relative pixels, due to the shape of swath B. However, in this example, and with reference to FIG. 8C, the variable pitch instrument platform 204 can be caused to both pitch-back and rotate or roll about the look axis, for example (i.e., rotate about two axes to achieve rotation in at least 2 degrees of freedom to change the sensor FOV) to generate look-back scan swath C. Effectuating movement of the variable pitch instrument platform 204 this way results in improved pixel projection overlay at the area of interest H during dwell because the pixels are better aligned between the Nadir scan swath A and the look-back scan swath C. This occurs because the projection of a pixel on a curved surface results in a skewed rhomboid shape which can be partially correct with the technology discussed herein. This can improve accuracy of scene evaluation in a select optimized region.

Figure 9:
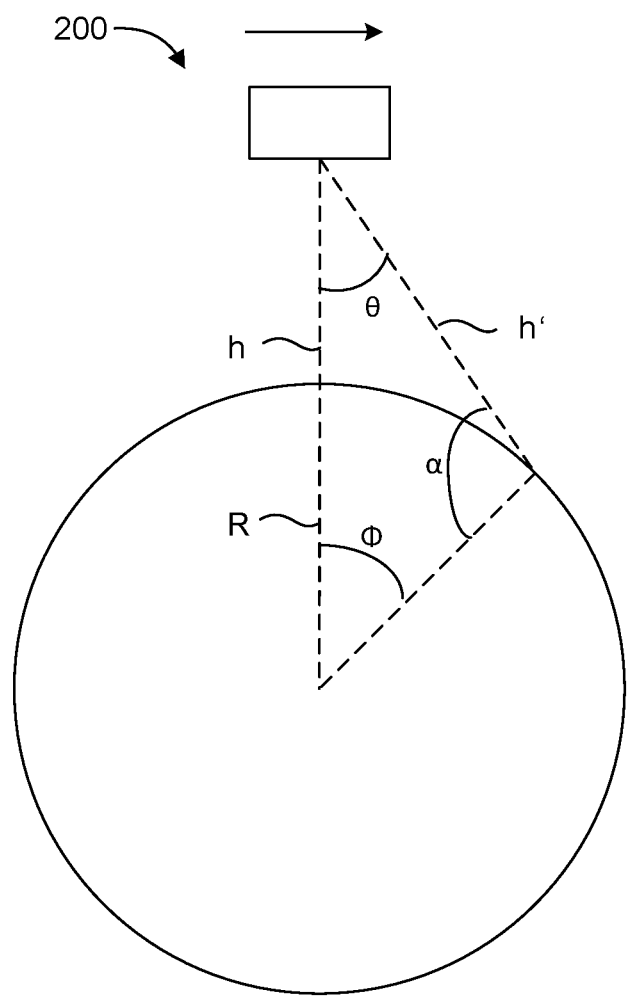
FIG. 9 illustrates geometric parameters when collecting data with a remote sensing vehicle in accordance with an example of the present disclosure.

FIG. 9 illustrates geometric parameters for operating the remote sensing vehicle 200 as pertaining to pitching forward the variable pitch instrument platform 204 in accordance with an example of the present disclosure. It should be appreciated that the principles discussed as follows will be similar for pitching-back the variable pitch instrument platform 204.

The below table shows one example of values pertaining to operating a remote sensing vehicle (e.g., 200, 250) and a movably coupled variable pitch instrument platform (e.g., 204, 254) as exemplified above and regarding FIG. 11 below.

| Parameter | Units | Value |
|---|---|---|
| Satellite altitude (h) | km | 828 |
| Orbit inclination angle | deg | 8.65 |
| Earth gravity constant | m^3/s^2 | 3.99E+14 |
| Earth radius (R) | km | 6378.14 |
| Orbital period | s | 6087.9 |
| Satellite angular velocity | mrad/s | 1.032 |
| Earth surface velocity at equator | km/s | 0.464 |
| Track velocity | km/s | 6.583 |
| Track velocity ECR | km/s | 6.668 |
| Telescope scan rate | rad/s | 3.53 |
| Telescope scan period | s | 1.780 |
| Track motion per scan | km | 11.869 |
| Pixel pitch | mm | 1.016 |
| Number of pixel in band | — | 16 |
| Focal length | mm | 1141 |
| IFOV | mrad | 0.891 |
| FOV | mrad | 14.253 |
| GFOV at Nadir | km | 11.801 |
| Overlap between scans at Nadir | km | −0.068 |
| Look ahead/behind angle (θ) | deg | 10 |
| α | deg | 2.9454 |
| φ | deg | 0.0217 |
| Effective altitude (h') | km | 840.92 |
| GFOV at look angle | km | 11.985 |
| Overlap between scans at look-ahead | km | 0.116 |

In this example, the remote sensing vehicle has an altitude (height h) of 828 km in a typical low-earth orbit (LEO orbit).

The height can vary, such as between low-earth and high-earth orbits. Notably, the remote sensing vehicle can be designed for a relatively low altitude orbit, as with many VIIRS satellites. The orbit inclination angle is approximately 8.56 degrees as a deviation from true polar orbit to maintain a sun-synchronous orbit path. Of course, the earth radius R is about 6378 km. The orbit period of the remote sensing vehicle is approximately 6088 seconds, and the angular velocity is 1.032 mrad/s. The travel velocity is approximately 6.583 km/s, and the track velocity Earth Coordinate Reference is approximately 6.668 km/s. In one example, the detector scan rate is 3.53 rad/s in a whisk broom configuration, but that can vary depending on the focal plane array parameters of the detector. The scan period is 1.78 seconds, and the track motion per scan is approximately 11.869 (i.e., distance on target surface between successive scans/swaths. The pixel pitch is approximately 1.016 mm, which is the distance between pixels, and the number of pixels in the band is approximately 16 pixels. In one example, the focal length is 1141 mm, and the IFOV is approximately 0.891 mrad (the instantaneous IFOV of 1 pixel). Thus, the FOV is 12.253 mrad, and the ground FOV at Nadir is approximately −0.068 km. In one example, the look ahead/behind angle (θ) (line of sight angle) is 10 degrees, but it can vary, such as between 0 degrees and the number of degrees to reach horizon h' in either the forward or rearward direction in some examples.

In one example, the ground point angle (α) is approximately 2.9454 between the remote sensing vehicle 200 and Nadir. The center of earth angle (φ) is approximately 0.0217 between ground point and Nadir. Thus, the effective altitude (h') is approximately 840.92 km, which is an increased optical path length from look-ahead angle. The ground FOV angle is approximately 11.985. In one example, the overlap between scans is approximately 0.116, which can be applied to the overlap 0 described regarding FIG. 3B. Of course, the above example parameters will vary depending on the altitude of the remote sensing vehicle (and various other factors), as will be apparent to those skilled in the art.

Note that the remote sensing vehicle examples discussed herein are not limited to low altitude orbit, and they can be operated at geostationary orbit (approximately 35,000 km elevation), or even HEL orbit. Further note that the remote sensing vehicle examples discussed herein can further collect data corresponding to RF communication links, synthetic-aperture radar (SAR), and/or other known technologies usable with such remote sensing vehicles for collecting data pertaining to any celestial body. And, in some examples, the remote sensing vehicle examples discussed herein could be any unmanned aerial vehicle (UAV), such as high-altitude long-endurance (HALE) UAVs, or lighter-than-air surveillance vehicles and platforms, all of which can operate at relatively low orbits for collecting data utilizing the devices and methods discussed herein regarding the remote sensing vehicle examples.

Figure 10A:
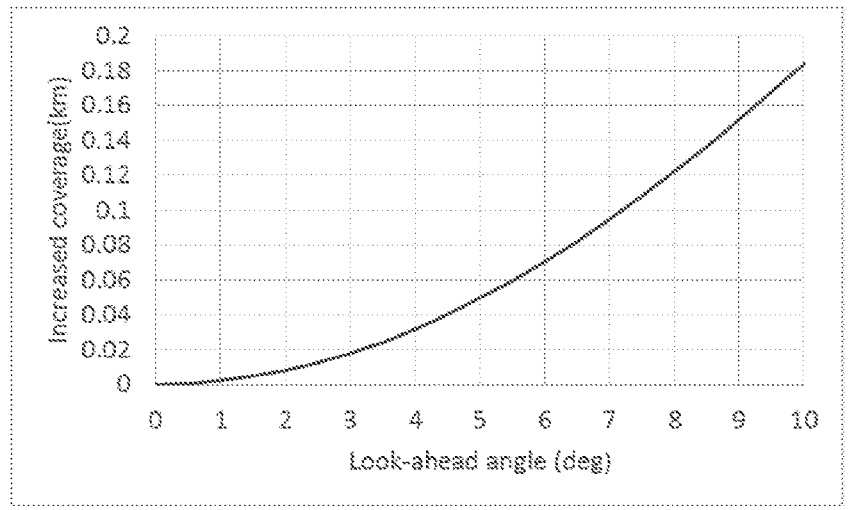
FIGS. 10A and 10B are graphs showing various data when collecting data with a remote sensing vehicle in accordance with an example of the present disclosure.
Figure 10B:
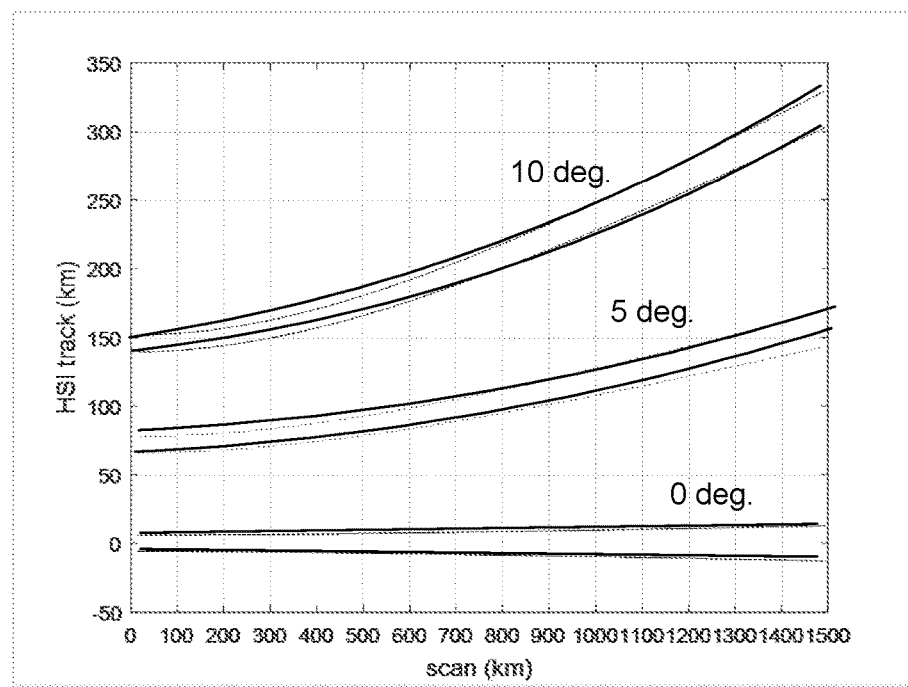

FIGS. 10A and 10B are graphs that illustrate correlations associated with operating a remote sensing vehicle (e.g., 200, 250) as exemplified above and regarding FIG. 11 below. In one example, as shown in FIG. 10A, as the look-ahead (or behind) angle increases from 0-10 degrees, the swath coverage increases slightly exponentially (due to the curvature of the earth). At a 5 degree pitch angle, a 0.05 km increased coverage distance is obtained, and at a 10 degree pitch angle, a 0.18 km increase coverage distance is obtained. FIG. 10B illustrates swath patterns for 0, 5 and 10 degree look-ahead angles. At 5 degrees, the scan/swath (km) coverage increases as horizontal sampling interval (HSI) track (km) increases. And at 10 degrees the scan/swath coverage increases as HSI track increases, but to a greater extent than when looking at 10 degrees. The pitch angle may be greater than 10 degrees, such as when orbiting at a lower altitude than exemplified above.

Figure 11:
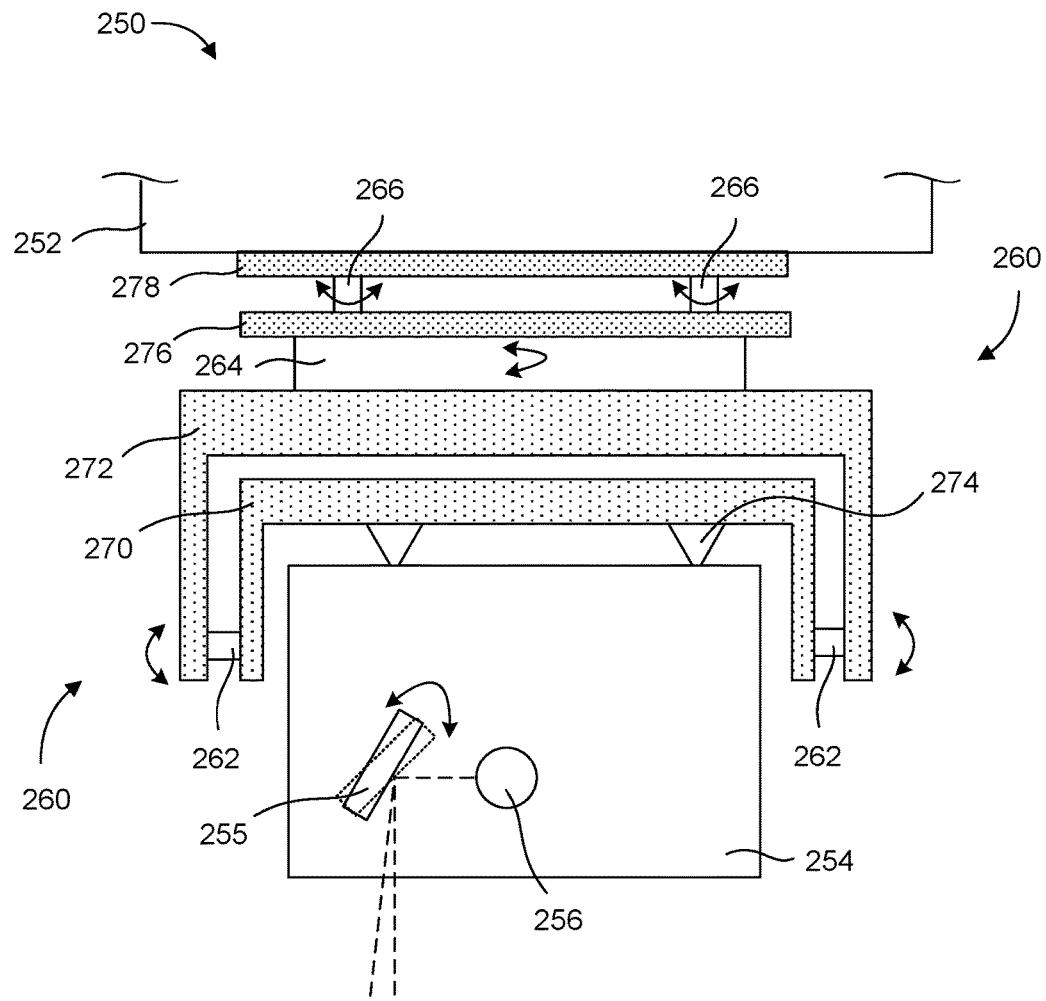
FIG. 11 illustrates a gimbal system of a remote sensing vehicle in accordance with an example of the present disclosure.

FIG. 11 illustrates an example of a dynamic coupling device (e.g., the dynamic coupling device 208 discussed above) that movably couples a variable pitch instrument platform (e.g., the variable pitch instrument platform 204 discussed above) to a host bus platform (e.g., the host bus platform 202 discussed above). In the illustrated example, a remote sensing vehicle 250 comprises a host bus platform 252 and a variable pitch instrument platform 254. The variable pitch instrument platform 254 can comprise and support a detector 256, such as detector 206 described above. A line of sight of the detector 256 can be adjusted or moved in a variety of different ways to achieve In one example, the variable pitch instrument platform 254 can comprise an adjustable optical device 255 positioned in an optical path with and adjacent the detector 256. The adjustable optical device 255 can be configured to be dynamically moveable to adjust a line of sight of the detector 256 (i.e., intra-payload line of sight adjustment). The adjustable optical device 255 can be an adjustable tip/tilt mirror or an adjustable decenter lens configured to modify boresight of the detector 256, similar to optical image stabilization, as illustrated by the rotational arrows. The adjustable optical device 255 can be mounted using well established mechanisms and methods as will be apparent to those skilled in the art.

In another example, the dynamic coupling device (e.g., 208) can comprise a gimbal system 260 that facilitates movement of the variable pitch instrument platform 254 relative to the host bus platform 252. Specifically, the gimbal system 260 can comprise a plurality of rotatable gimbal devices 262, 264, and 266 to facilitate rotation of the variable pitch platform 254 in at least one, and up to three, rotational degrees of freedom, wherein such movement is relative to the host bus platform 252. For instance, a pair of first gimbal devices 262 can be configured to provide rotation of the variable pitch instrument platform 254 about an axis Y (a horizontal axis when viewing FIG. 11) with any desired number of degrees of movement or adjustment relative to the host bus platform 252. To this end, a first support structure 270 can be rotatably coupled to a second support structure 272 by the pair of first gimbal devices 262. Gimbaled devices could be as simple as nested hinged brackets or more complex, such as sleeved bearings with cross-roll axes. As shown, the first support structure 270 can be configured to structurally support the variable pitch instrument platform 254 via mounts 274, which can comprise various fasteners or other mounting hardware.

A second gimbal device 264 can be configured to provide rotation of the variable pitch instrument platform 254 about an axis X (a vertical axis when viewing FIG. 11) with any desired number of degrees of movement or adjustment. Gimbal device 264 can comprise a cylindrical drum or disc that rotatably couples the second support structure 272 to a third support structure 276.

A pair of third gimbal devices 266 can be configured to provide rotation (e.g., tilt) of the variable pitch instrument platform 254 about an axis Z (an axis extending into and out of the page when viewing FIG. 11) with any number of degrees of movement or adjustment. In one example, a third gimbal device could be coupled proximate gimbal devices 266 (between structures 276 and 278) to provide three degrees of freedom with any number of degrees of movement or adjustment. Thus, the pair of third gimbal devices 266 rotatably couples the third support structure 276 to a fourth support structure 278. Accordingly, the fourth support structure 278 can be statically mounted to the host bus platform 252 using a variety of mounting means and methods. Each of gimbal devices discussed herein can comprise any type of gimbal system (e.g., rods and pins) that rotatably couple one structure to another structure, as will be recognized by those skilled in the art.

Although three degrees of freedom are provided for in the example dynamic coupling device of the remote sensing vehicle 250 shown in FIG. 11, it should be appreciated that a single gimbal device/system (e.g., 262, 264, or 266) can be incorporated as described above to provide a single degree of rotational freedom of the variable pitch instrument platform 254 relative to the host bus platform 252. As such, the variable pitch instrument platform 254 is contemplated to be moveable in at least one, or a plurality of, degree(s) of freedom. In addition, the degree of movement or adjustability is not intended to be limited in any way. Indeed, those skilled in the art will recognize that the remote sensing vehicle 250 and its associated dynamic coupling device can be configured to provide any degree of movement of the variable pitch instrument platform relative to the host bus platform 252, such as between 0 and 180 degrees. More specifically, the dynamic coupling device can be configured to provide line of sight adjustability of the detector of any degree, such as between 0 degrees up to the number of degrees needed to scan a target surface area on a forward or rearward horizon, which number of degrees can depend upon the orbit ephemeris of the remote sensing vehicle 250. Furthermore, the gimbal devices 262, 264, and/or 266 can be actuated by any suitable, known mechanisms, such as electric motor actuators, rotary solenoids, rack-and-pinion gearing, flexures, four-bar linkages, and others as will be recognized by those skilled in the art.

As can be seen, the dynamic coupling device (e.g., one that includes the gimbal system 260 or a single gimbal) provides inter-payload adjustment of payload pointing of the variable pitch platform 254, and consequently line of sight adjustment of the detector 256. The adjustable optical device 255 can also be configured to provide intra-payload adjustment of payload pointing of the variable pitch platform 254, and consequently line of sight adjustment of the detector 256. In some examples, these can be carried out concurrently by configuring the remote sensing vehicle 250 with the systems discussed herein. Both intra and inter payload adjustment provides up to three different line of sight adjustment mechanisms (one for each degree of freedom: tip, tilt, and roll), which provides improved flexibility of the entire remote sensing vehicle 250 to dynamically modify the pointing position via two different methods of line of sight adjustment. Thus, due to the pointing flexibility provided by the gimbal system 260 and the adjustable optical device 255, the variable pitch platform 254 can be variably controlled (in three rotational degrees of freedom) for boresight alignment of two subassemblies within a sensor of the variable pitch platform 254, or between two sensors of the variable pitch platform 254. This can provide the advantage of not being required to break a thermal vacuum during integration/testing evolutions of the system, which reduces scheduling time of the remote sensing vehicle 250 during sensing, thereby minimizing costs. It is noted that the dynamic coupling device can comprise sufficient stiffness or some type of locking mechanism to withstand launch loads.

Figure 12:
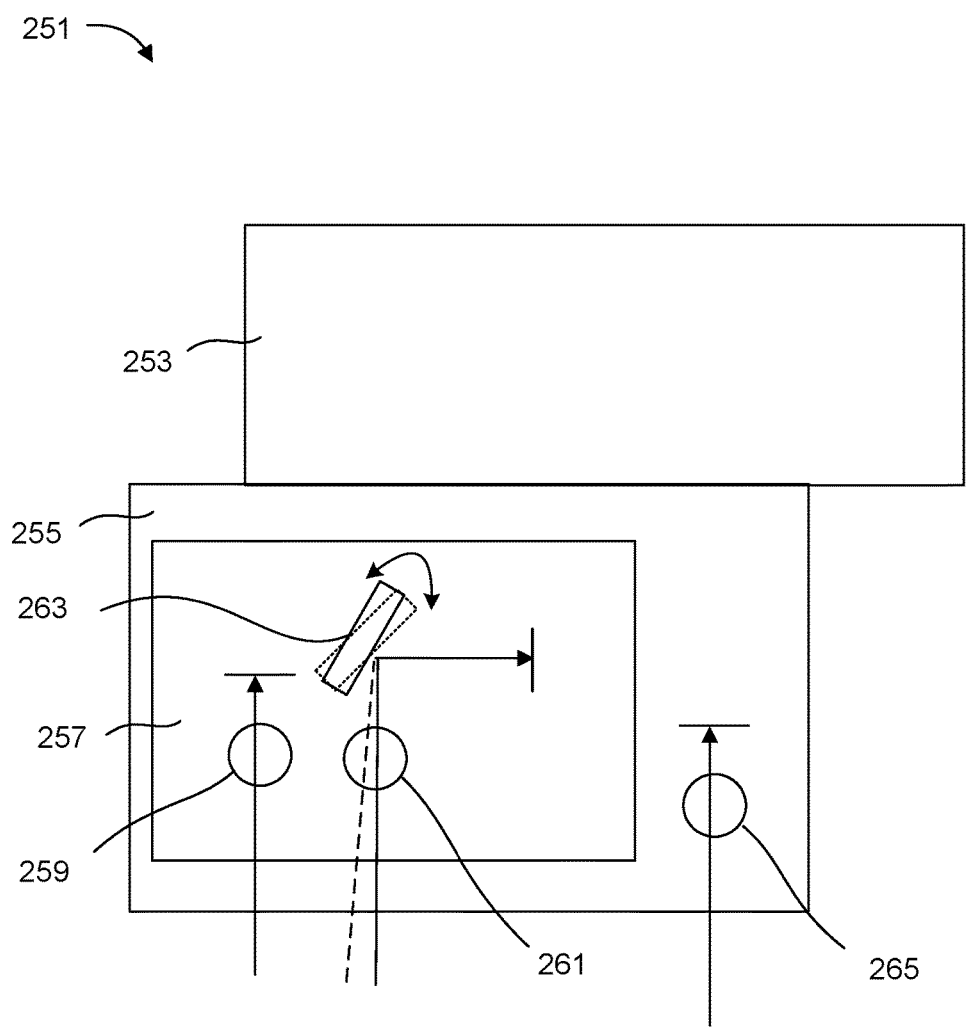
FIG. 12 illustrates payload pointing adjustments in accordance with an example of the present disclosure.

FIG. 12 illustrates an example remote sensing vehicle 251 comprising a host bus platform 253 and a host instrument platform 255. The host instrument platform 255 (e.g., a VIIRS) can be statically mounted to the host bus platform 253 (as in FIG. 12), or it can be dynamically mounted or moveably coupled to the host bus platform, such as is described above, in which case the host instrument platform is referred to as a variable pitch instrument platform (e.g., 204, 254), this being movable relative to the host bus platform (e.g., 202, 254).

The host instrument platform 255 can comprise a dynamically movable sensor platform 257 configured to modify a pointing position of a particular sensor, such as during orbit. For instance, the dynamically movable sensor platform 257 can comprise and support a first detector 259 and a second detector 261 (such detectors 259 and 261 can each be similar to detector 206 described above). A line of sight of the second detector 261 can be adjusted or modified via an adjustable optical device 263 positioned adjacent to and in an optical path with the second detector 261. The adjustable optical device 263 can be configured to be dynamically moveable during orbit to adjust a line of sight of the second detector 261 relative to the first detector 259. In some examples, the adjustable optical device 263 can be an adjustable tip/tilt mirror or an adjustable decenter lens configured to modify boresight of the detector 261, similar to optical image stabilization, as illustrated by the rotational arrows. The adjustable optical device 263 can be mounted using well established mechanisms and methods as will be apparent to those skilled in the art.

The adjustable optical device 263 can also facilitate decoupling of sensor pointing from host instrument pointing. Specifically, a host instrument sensor 265 can have an established boresight relative to the second sensor 261. Then, whether remotely, manually or autonomously controlled, the adjustable optical device 263 can be moved dynamically during orbit to modify the pointing position of the second sensor 261 relative to the host instrument sensor 265, thereby decoupling sensor pointing of the second sensor 261 of the dynamically movable sensor platform 257 from the established boresight of the host instrument sensor 265.

Both intra-payload pointing adjustment (FIG. 12) and inter-payload pointing adjustment (FIGS. 1-11) provide up to three different line of sight adjustment mechanisms (one for each degree of freedom: tip, tilt, and roll), which provides improved flexibility of the entire remote sensing vehicle(s) to dynamically modify a pointing position of a particular sensor. Thus, due to the pointing flexibility provided by the gimbal system 260 and the adjustable optical device 255, the variable pitch platform 254 can be variably controlled (in three rotational degrees of freedom) for boresight alignment of two subassemblies within a sensor of the variable pitch platform 254, or between two sensors of a sensor platform (e.g., 257). This can provide the advantage of avoiding breaking a thermal vacuum of a host instrument platform (e.g., VIIRS) during integration/testing evolutions of the system, which dramatically reduces scheduling time of a remote sensing vehicle during sensing, thereby drastically minimizing costs. This is because a particular pointing position of a particular sensor can be remotely modified, as discussed above, while in a thermal vacuum in a host instrument platform.

The aforementioned degree of freedom(s) can be achieved remotely from a base station or other remote location, using systems well known in the art that transmit control signals to a host bus. Thus, the panning, tilting, or rolling of the variable pitch instrument platform can be controlled remotely, whether manually and/or automatically from a remote computer system.

The aforementioned examples provide mission flexibility to dwell on a target of interest, revisit the target of interest, and/or change sensor parameters (e.g., IFOV, ground albedo, etc.), while providing imagery diversity through offloading mission parameters (i.e., of the variable pitch instrument platform) from host bus parameters and/or sensor operational parameters on the host bus.

The aforementioned example further allows adjustment of pixel aspect ratio at center or edge of scan/swath (i.e., in-scan versus cross-scan dimension).

Figure 13:
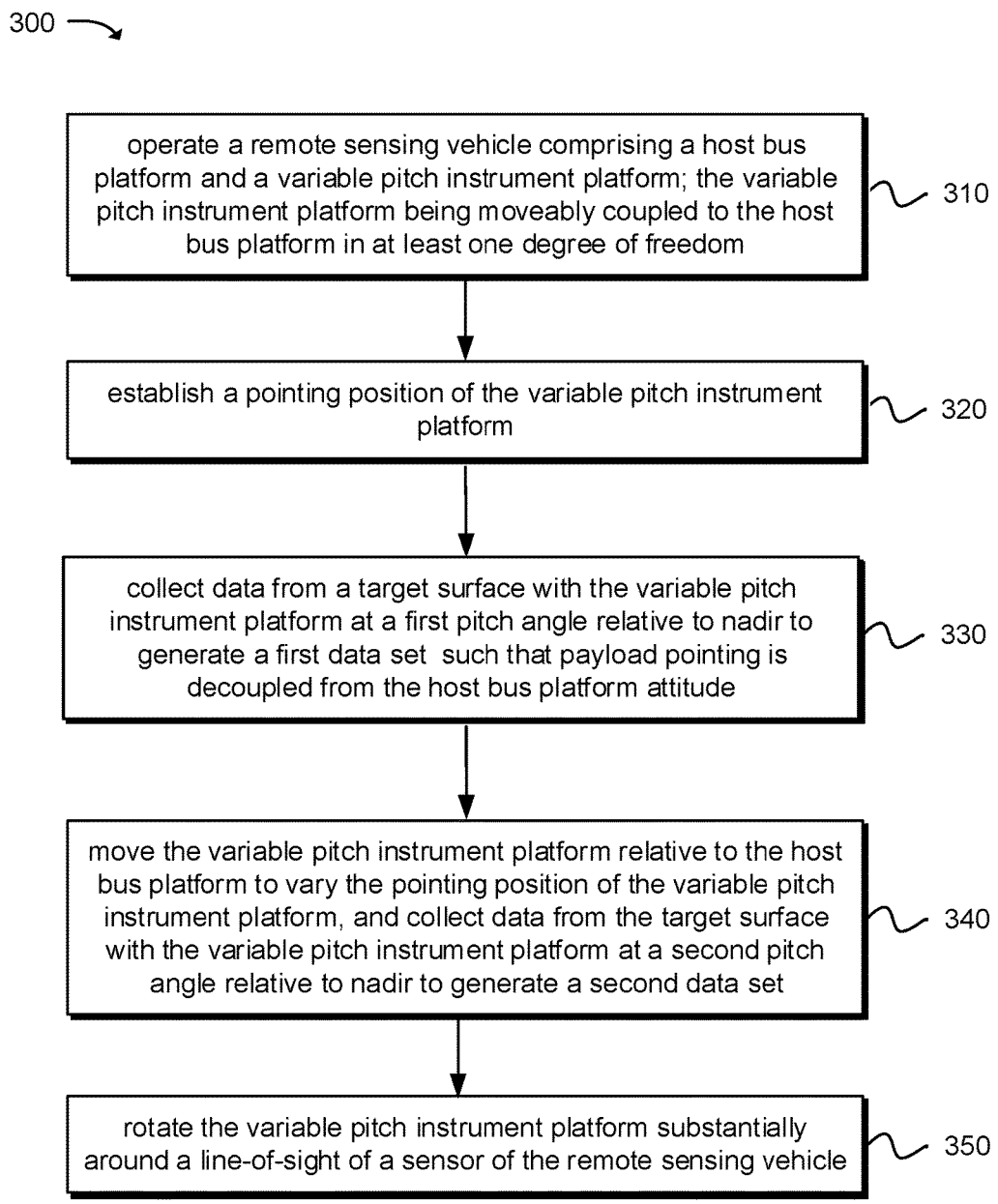
FIG. 13 illustrates a method of operating a remote sensing vehicle in accordance with an example of the present disclosure.

FIG. 13 illustrates a block diagram of a method 300 for decoupling payload pointing from a host bus platform in accordance with an example of the present disclosure. The method can comprise step 310, operating a remote sensing vehicle (e.g., 200, 250) comprising a host bus platform (e.g., 202, 252) and a variable pitch instrument platform (e.g., 204, 254), such as those described above. The variable pitch instrument platform can be moveably coupled to the host bus platform in at least one degree of freedom, such as described above in reference to FIG. 11. The method can comprise step 320, establishing a pointing position of the variable pitch instrument platform, such as discussed above in reference to FIG. 2. The method can further comprise step 330, collecting data from a target surface with the variable pitch instrument platform at a first pitch angle (e.g., pitch angle B) relative to Nadir to generate a first data set (corresponding to a first image (e.g., swath SB)), such that payload pointing is decoupled from the host bus platform attitude. As discussed above in describing FIG. 4, the payload data collection can be independent of attitude or other control or movement of the host bus platform. The method can further comprise step 340, moving or adjusting the variable pitch instrument platform relative to the host bus platform to vary the pointing position of the variable pitch instrument platform, as discussed above in reference to FIG. 4, and further collecting data from (e.g., scanning) the target surface with the variable pitch instrument platform at a second pitch angle (e.g., pitch angle C) relative to Nadir to generate a second data set (corresponding to a second image (e.g., swath SC)). The data sets and images can be processed in accordance with known techniques and using known processing equipment and methods. The method can further comprise 350, rotating the variable pitch instrument platform substantially around a line-of-sight of a sensor of the remote sensing vehicle. This motion may allow pixels within the image to be rotated, presenting a larger overlap with pixels from other sensors or from other scans.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method of decoupling payload pointing from a host bus platform, the method comprising:
    operating a remote sensing vehicle comprising a host bus platform and a variable pitch instrument platform, wherein the variable pitch instrument platform is moveably coupled to the host bus platform in at least one degree of freedom via a dynamic coupling device;
    establishing a pointing position of an image sensor of the variable pitch instrument platform to establish payload pointing of the image sensor;
    operating the image sensor mounted on the variable pitch instrument platform at a first pitch angle relative to Nadir, thereby scanning a target surface to generate a first data set for processing with a processor;
    moving the variable pitch instrument platform relative to the host bus platform to vary the pointing position of the image sensor of the variable pitch instrument platform; and
    operating the image sensor at a second pitch angle relative to Nadir, thereby scanning the target surface to generate a second data set for processing with the processor,
    such that payload pointing of the image sensor, and scanning with the image sensor, are decoupled from the host bus platform attitude, the payload pointing and scanning being independent of attitude control of the host bus platform.

2. The method of claim 1, wherein the variable pitch instrument platform is moveably coupled to the host bus platform in three degrees of freedom.

3. The method of claim 1, wherein establishing pointing angles to the target surface with the variable pitch instrument platform off-loads payload pointing from the host bus platform.

4. The method of claim 1, wherein moving the variable pitch instrument platform relative to the host bus platform to vary the pointing position of the image sensor facilitates dynamic control of pixel shape and size of at least one of the first or second data sets.

5. The method of claim 1, wherein moving the variable pitch instrument platform relative to the host bus platform to modify the pointing position of the variable pitch instrument platform comprises interrogating the target surface to optimize or control dwell time over a given portion of the target surface.

6. The method of claim 1, wherein moving the variable pitch instrument platform relative to the host bus platform comprises dynamically modifying boresight of the image sensor of the variable pitch instrument platform.

7. The method of claim 6, wherein dynamically modifying boresight of the image sensor of the variable pitch instrument platform comprises accounting for data collection errors due to orbit degradation of the host bus platform.

8. The method of claim 1, further comprising repeatedly collecting data from the target surface at the first pitch angle to generate a plurality of successive images, wherein adjacent images of the plurality of successive images have overlapping pixels.

9. The method of claim 1, further comprising remotely controlling the pointing position and roll angle of the variable pitch instrument platform from a remote location.

10. The method of claim 1, further comprising remotely panning, tilting, or rolling the variable pitch instrument platform relative to the host bus to modify the pointing position or aspect.

11. The method of claim 1, further comprising varying a ground-sample-distance value of adjacent images captured by the variable pitch instrument platform by moving the variable pitch instrument platform relative to the host bus platform.

12. A method of varying a ground-sample-distance (GSD) value with a remote sensing vehicle, comprising:
   operating a remote sensing vehicle comprising a variable pitch instrument platform and a host bus platform, the variable pitch instrument platform movably coupled to the remote sensing vehicle in at least one degree of freedom via a dynamic coupling device;
   scanning a target surface with an image sensor mounted to the variable pitch instrument platform at a first pitch angle relative to Nadir to generate a first data set for processing the first data set with a processor;
   varying a pointing position of the image sensor of the variable pitch instrument platform by moving the variable pitch instrument platform relative to the host bus platform; and
   scanning the target surface with the image sensor of the variable pitch instrument platform at a second pitch angle to generate a second data set, thereby varying a GSD value of successive swaths generated by the first and second data sets.

13. The method of claim 12, wherein moving the variable pitch instrument platform is independent from attitude control of the host bus platform.

14. The method of claim 12, further comprising modifying boresight of a detector of the variable pitch instrument platform relative to boresight of the image sensor, thereby providing intra-instrument capabilities for boresight adjustment.

15. The method of claim 12, further comprising modifying boresight of a pair of detectors of the variable pitch instrument platform by moving the variable pitch instrument platform via at least one gimbal device and via an adjustable optical device.

16. The method of claim 12, further comprising synchronizing the second pitch angle with a relative velocity of the remote sensing vehicle, such that the first and second data sets are substantially similar, and without modifying the attitude of the host bus platform.

17. The method of claim 12, further comprising remotely controlling the pointing position of the variable pitch instrument platform.

18. A remote sensing vehicle, comprising;
   a host bus platform comprising a first satellite support structure;
   a variable pitch instrument platform comprising a second satellite support structure and a detector for scanning a target surface; and
   a dynamic coupling device that movably couples the second satellite support structure of the variable pitch instrument platform to the first satellite support structure of the host bus platform in at least one degree of freedom;
   wherein the variable pitch instrument platform is movable relative to the host bus platform to move the image sensor of the variable pitch instrument platform from a first pointing position to a second pointing position, such that payload pointing and scanning with the image sensor is decoupled from the host bus platform attitude.

19. The remote sensing vehicle of claim 18, wherein the variable pitch instrument platform is configured to be dynamically moved relative to the host bus platform during transit of the remote sensing vehicle to change a pitch angle of the variable pitch instrument platform.

20. The remote sensing vehicle of claim 18, wherein the dynamic coupling device comprises a gimbal system that facilitates movement of the variable pitch instrument platform relative to the host bus platform.

21. The remote sensing vehicle of claim 19, wherein the gimbal system comprises a plurality of rotatable gimbal devices that couple the variable pitch platform to the host bus platform, wherein the plurality of rotatable gimbal devices facilitate rotation of the variable pitch platform in three rotational degrees of freedom relative to the host bus platform.

22. The remote sensing vehicle of claim 18, wherein the variable pitch instrument platform is configured to move relative to the host bus platform independent from attitude control of the host bus platform.

23. The remote sensing vehicle of claim 18, wherein the image sensor of the variable pitch instrument platform is configured to generate a first data set when in a first pitch angle position that is established by the first pointing position, and then generate a second data set when in a second pitch angle position that is established by the second pointing position, upon movement of the variable pitch instrument platform relative to the host bus platform.

24. The remote sensing vehicle of claim 18, wherein the remote sensing vehicle comprises at least one of a whisk broom scanning satellite or a push broom scanning satellite configured to orbit less than 40,000 km above the target surface during scanning operations.

25. The remote sensing vehicle of claim 18, wherein the variable pitch instrument platform is configured to be dynamically moved relative to the host bus platform during orbit to modify a pitch angle of the variable pitch instrument platform, thereby varying a ground-sample-distance value between successive adjacent images gathered by the image sensor of the variable pitch instrument platform.

26. The remote sensing vehicle of claim 18, wherein the variable pitch instrument platform comprises an adjustable optical device configured to be dynamically moved to dynamically adjust a line of sight of the image sensor, thereby providing intra-instrument capability for boresight or line of sight adjustments.

27. A method of decoupling sensor pointing from host instrument pointing, the method comprising:
   operating a remote sensing vehicle comprising a host instrument platform comprising a dynamically movable sensor platform movably coupled to the host instrument platform via a dynamic coupling device;

establishing a pointing position of a first image sensor of the dynamically movable sensor platform; and modifying the pointing position of the first image sensor relative to established boresight of a second image sensor of the host instrument platform to generate a first data set for processing with a processor, such that sensor pointing of the first image sensor of the dynamically movable sensor platform is decoupled from sensor pointing of the second image sensor of the host instrument platform, such that generation of the first image data set is independent of attitude control of the host instrument platform.

28. The method of claim 27, further comprising moving the host instrument platform relative to a host bus platform to vary the pointing position relative to established boresight of the dynamically movable sensor platform, and further comprising collecting data with the dynamically movable sensor platform at a second pitch angle relative to said established boresight to generate a second data set.

29. The method of claim 27, wherein establishing the pointing position of the first sensor of the dynamically movable sensor platform off-loads sensor pointing from the host instrument platform.

30. The method of claim 27, further comprising moving a mirror, adjacent the first sensor and in an optical path with the first sensor, to modify the pointing position of the first sensor relative to a third sensor of the dynamically movable sensor platform.

* * * * *